(12) United States Patent
Tanaka et al.

(10) Patent No.: US 7,048,894 B2
(45) Date of Patent: May 23, 2006

(54) CERAMIC FILTER AND CATALYST-LOADED CERAMIC FILTER

(75) Inventors: Masakazu Tanaka, Okazaki (JP); Tosiharu Kondo, Toyoake (JP); Hiromi Sano, Nagoya (JP); Mamoru Nishimura, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/180,033

(22) Filed: Jun. 27, 2002

(65) Prior Publication Data
US 2003/0007905 A1    Jan. 9, 2003

(30) Foreign Application Priority Data
Jun. 28, 2001  (JP) .............................. 2001-196674
Apr. 18, 2002  (JP) .............................. 2002-116725

(51) Int. Cl.
F01N 3/28 (2006.01)

(52) U.S. Cl. .................... 422/177; 422/180; 428/304.4

(58) Field of Classification Search ............. 428/304.4; 502/300, 240; 422/171, 177, 180
See application file for complete search history.

(56) References Cited

U.S. PATENT DOCUMENTS

| | | | |
|---|---|---|---|
| 3,956,186 A | | 5/1976 | Iwase et al. |
| 4,189,405 A | | 2/1980 | Knapton et al. |
| 4,335,023 A | * | 6/1982 | Dettling et al. ............. 502/262 |
| 4,774,217 A | * | 9/1988 | Takeuchi et al. ............ 502/178 |
| 4,956,329 A | | 9/1990 | Chao et al. |
| 5,006,221 A | * | 4/1991 | Uchikawa et al. .......... 204/426 |
| 5,039,647 A | | 8/1991 | Ihara et al. |
| 5,334,570 A | * | 8/1994 | Beauseigneur et al. ..... 502/304 |
| 5,346,722 A | | 9/1994 | Beauseigneur et al. |
| 5,489,865 A | | 2/1996 | Colvin, Sr. |
| 5,607,885 A | | 3/1997 | Ichii et al. |
| 5,716,899 A | | 2/1998 | Guile et al. |
| 5,820,693 A | * | 10/1998 | Patchett et al. .......... 134/22.12 |
| 6,159,893 A | | 12/2000 | Kondo |
| 6,162,524 A | * | 12/2000 | Patchett et al. ............. 428/116 |
| 6,171,573 B1 | | 1/2001 | Sato |
| 6,245,301 B1 | * | 6/2001 | Stroom et al. .............. 422/179 |
| 6,284,188 B1 | * | 9/2001 | Andou et al. ............... 264/631 |
| 2002/0042344 A1 | * | 4/2002 | Kondo et al. |
| 2002/0045541 A1 | * | 4/2002 | Koike et al. |
| 2002/0053202 A1 | * | 5/2002 | Akama et al. ................. 60/297 |
| 2003/0039598 A1 | * | 2/2003 | Nishimura et al. ......... 422/177 |
| 2003/0086835 A1 | * | 5/2003 | Suzawa et al. |

FOREIGN PATENT DOCUMENTS

| | | | |
|---|---|---|---|
| EP | 0 736 503 A1 | | 10/1996 |
| EP | 0 766 993 A2 | | 4/1997 |
| EP | 0 857 511 A2 | | 8/1998 |
| EP | 1043067 | * | 10/2000 |
| FR | 1479602 | | 5/1997 |
| JP | 62004441 A | * | 1/1987 |
| JP | A-10-202105 | | 8/1998 |

* cited by examiner

Primary Examiner—Steven Bos
(74) Attorney, Agent, or Firm—Nixon & Vanderhye P.C.

(57) ABSTRACT

A catalyst-loaded ceramic filter made of a ceramic material capable of directly supporting a catalyst component thereon is capable of providing early activation of the catalyst with a low coefficient of thermal expansion and light weight, without compromising the high porosity of the filter substrate. A catalyst-loaded ceramic filter is made of a ceramic material of which one or more kinds of element among its constituent elements is substituted with an element other than the constituent elements, for example a ceramic material with a part of Si or other elements included in cordierite is substituted with W or Co, as a filter substrate of honeycomb structure having a number of cells separated by porous walls, and supporting a catalyst such as a noble metal directly on the W.

28 Claims, 5 Drawing Sheets

Fig.2
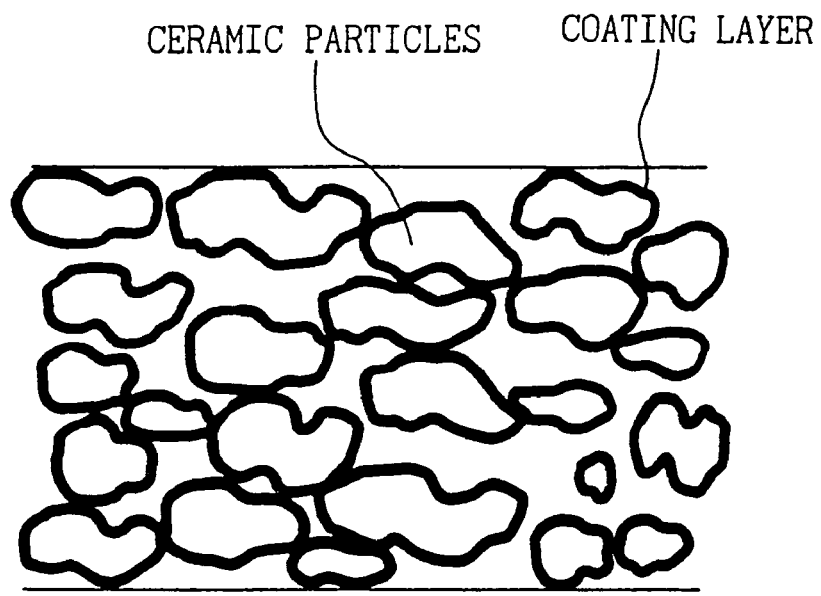
Fig.3(a)  Fig.3(b)
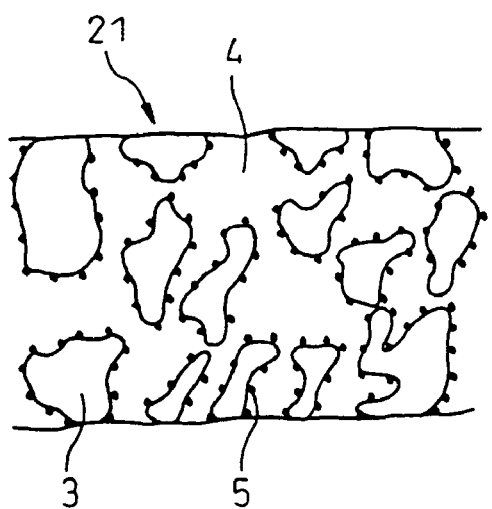 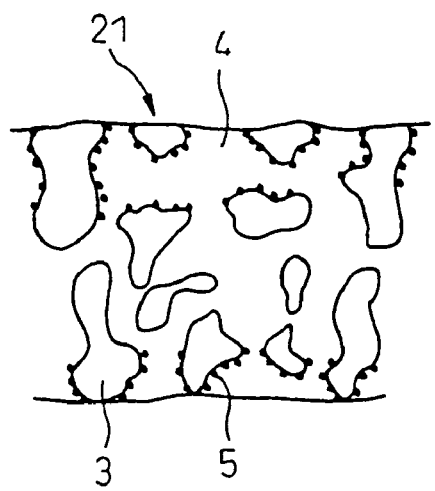

CERAMIC FILTER AND CATALYST-LOADED CERAMIC FILTER

BACKGROUND OF THE INVENTION

1. Field of the Invention

The present invention relates to a ceramic filter that collects particulate matter included in the exhaust gas emitted from automobile engines, and a catalyst-loaded ceramic filter that has a catalytic function to remove the particulate matter.

2. Description of the Related Art

It has been a practice to collect fine particles such as soot (particulate matter) included in the exhaust gas emitted from diesel engines, by means of a particulate collecting filter (DPF) installed in the exhaust gas passage. The DPF employs a honeycomb structural body made of porous ceramic material as a filter substrate, that has a large number of cells formed parallel to the direction of the exhaust gas flow. Cells that adjoin each other are separated by a porous wall, with one end of each cell being stopped, at the inlet or outlet side in a staggered arrangement, so that the particulate matter is collected while the exhaust gas flows through the porous walls between the cells.

The particulate matter that has been collected can be removed by burning, with for example, an electric heater or a burner, periodically. Unfortunately, this method has a drawback in that the DPF is heated excessively during burning when too much particulate matter has been collected, eventually leading to breakage of the DPF due to thermal stress. To prevent this problem, a catalyst-loaded DPF has been proposed that burns the particulate matter through a catalytic reaction in order to lower the burning temperature. Various methods have been studied which would the catalyst-loaded DPF to burn and remove the particulate matter, such as direct oxidation of the particulate matter, or oxidizing NO included in the exhaust gas into $NO_2$, and oxidizing the particulate matter with $NO_2$.

However, the DPF materials (cordierite, SiC, etc.) currently in use are not capable of directly supporting a catalyst metal and, accordingly the catalyst-loaded DPF is usually wash-coated with γ-alumina or the like on the surface of the filter substrate so as to form a coating layer that supports the catalyst metal. However, this constitution has a decreased porosity in the filter substrate due to the formation of the coating layer, resulting in very high pressure loss (two to three times that of a filter substrate having a porosity of 50%, when the coating layer is formed) and a significant increase in the weight (two to three times that of a filter substrate having a porosity of 50%, when the coating layer is formed). There are also problems where the coating layer reduces the thermal shock resistance due to a higher coefficient of thermal expansion and impedes early development of catalytic activity due to an increased heat capacity.

SUMMARY OF THE INVENTION

With the background described above, an object of the present invention is to provide a ceramic filter and a catalyst-loaded ceramic filter that combine a high particulate collecting rate and a low pressure loss without compromising the high porosity of the filter substrate, and have low coefficient of thermal expansion and light weight while being capable of developing catalytic activity in an early stage.

A first aspect of the invention is a ceramic filter comprising a porous filter substrate formed in honeycomb structure, that has a number of cells separated from each other by porous walls with one end of each cell being stopped at the inlet or outlet side in a staggered arrangement. The ceramic material of the filter substrate has one or more kinds of element among the constituent elements thereof being substituted with an element other than the constituent elements, so that a catalyst metal can be supported directly on the substituting element.

The ceramic filter of the invention can directly support a catalyst metal on the substituting element introduced into the ceramic material of the filter substrate, and therefore it is not necessary to form a coating layer of γ-alumina. Thus, the ceramic filter has a higher porosity than that in the prior art, so that the resistance of the porous walls to the gas flowing therethrough can be kept low, and it is possible to burn and remove the collected particulate matter by means of the catalyst metal that is supported thereon. As a result, a high performance ceramic filter can be made that has a low pressure loss, a low coefficient of thermal expansion and has a reduced weight and can develop a catalytic activity in the early stage.

The substrate of the ceramic filter of the present invention collects the particulate matter included in the exhaust gas on the pores in the porous walls. The ceramic filter of the present invention can be preferably used for collecting the particulate matter included in the exhaust gas of diesel engines, and is capable of burning and removing the collected particulate matter by means of the catalyst metal that is supported thereon.

In the ceramic filter of the present invention, the porosity of the filter substrate is usually set to 40% or higher. This makes it possible to combine a higher particulate matter collecting rate and a lower pressure loss. The porosity of the filter substrate is preferably set to 50% or higher, more preferably in a range from 40% to 80% and most preferably in a range from 50% to 70%.

In the ceramic filter of the present invention, the proportion of pores measuring 100 μm or larger across is preferably not higher than 20% of all pores formed in the filter substrate. As larger pores result in a lower particulate matter collecting rate, it is better to reduce the proportion of pores measuring 100 μm or larger. It is more preferable to keep the proportion of pores measuring 70 μm or larger to within 10% of all pores.

In the ceramic filter of the present invention, the mean pore size of the filter substrate is preferably set to 50 μm or smaller, so as to improve the particulate matter collecting rate while maintaining a high porosity. It is more preferable to set the mean pore size of the filter substrate to 30 μm or smaller.

In the ceramic filter of the present invention, the pores formed in the filter substrate preferably communicate with each other. This allows the exhaust gas to flow easily between the cells, thereby reducing the resistance to the flow.

The ceramic filter of the present invention preferably uses a ceramic material that uses cordierite, as the main component, for the filter substrate. Cordierite, that has a low coefficient of thermal expansion and high resistance to thermal shock, is suitable as a catalyst support to be used in a harsh environment such as that of an automobile engine.

In the ceramic filter of the present invention, one element or more that has a d or an f orbit in the electron orbits thereof is used as the element that substitutes for the constituent element of the ceramic material that makes the filter substrate. Such elements have energy levels close to that of the catalyst metal and can therefore easily exchange electrons therewith, so that the catalyst metal can be readily supported thereon.

The catalyst-loaded ceramic filter of the present invention comprises the ceramic filter described above and a catalyst metal directly supported thereon. As the catalyst-loaded ceramic filter of the present invention does not have a coating layer, the advantages of the filter substrate such as high particulate collecting rate, low pressure loss, low coefficient of thermal expansion and light weight can be retained and, at the same time, an excellent purifying performance can be achieved by continuously burning the particulate matter that has been collected using the catalyst metal directly supported thereon.

In the catalyst-loaded ceramic filter of the present invention, a catalyst having a catalytic oxidation function is used as the catalyst supported on the ceramic filter. This constitution allows the catalyst metal to oxidize and burn the particulate matter collected in the pores of the filter substrate, thereby purifying the exhaust gas.

Specifically, a catalyst that can directly oxidize and burn the particulate matter included in the introduced exhaust gas can be used as the catalyst metal. Alternatively, a catalyst may be used that oxidizes nitrogen oxide included in the introduced exhaust gas so that the particulate matter is oxidized and burned by the oxidized nitrogen oxide.

In the catalyst-loaded ceramic filter of the present invention, the catalyst metal can be supported directly on the substituting element through chemical bonding. Chemical bonding of the catalyst metal with the substituting element results in higher catalyst retention performance than in the ordinary catalyst supporting configuration where catalyst metal particles are supported in pores formed in the porous coating layer. This configuration also has the advantage that the catalyst deteriorates less over a long period of use, because the catalyst metal can be uniformly distributed over the support and is less likely to coagulate.

The catalyst-loaded ceramic filter of the present invention preferably uses, as the catalyst metal, one or more element selected from among Pt, Pd, Rh, Ir, Ti, Cu. Ni, Fe, Co, W, Au, Ag, Ru, Mn, Cr, V and Se. These metals can chemically bond with the substituting element introduced into the cordierite or the like, that constitutes the filter substrate, and function as an oxidizing catalyst that continuously burns the collected particulate matter.

According to a second aspect of the invention, a porous filter substrate is formed in a honeycomb configuration, and a number of cells separated from each other by porous walls are formed, with the end of each cell being stopped at the inlet or outlet side in a staggered arrangement. The ceramic material of the filter substrate has numerous pores that can support the catalyst directly on the surfaces thereof.

According to the present invention, the filter substrate may have multitude of pores that can directly support the catalyst on the ceramic surface, so that it is not necessary to form a coating layer of γ-alumina to support the catalyst component in the pores. Thus the ceramic filter has a higher porosity than the prior art so that the resistance of the porous walls to the gas flowing therethrough can be kept low, and the effect of burning and removing the collected particulate matter, by means of the catalyst metal that is supported thereon, can be achieved. As a result, a high performance ceramic filter can be made that has a low pressure loss and a low coefficient of thermal expansion, is low in weight and develops the catalyst activity in the early stage.

The pores consist of at least one kind of defects in the ceramic crystal lattice, microscopic cracks in the ceramic surface or a deficiency of elements that constitute the ceramic material. The width of the microscopic cracks is preferably 100 nm or less in order to ensure mechanical strength of the catalyst support.

The pores have lateral dimension preferably 1000 times or less as large as the diameter of the catalyst ion to be supported thereon, in order to be capable of supporting the catalyst component. In this case, the catalyst component of comparable amount as in the prior art can be supported when the density of pores is $1 \times 10^{11}$/L or higher.

The filter substrate is preferably made of a ceramic material including cordierite as the main component, while the pores may consist of defects formed by substituting a part of the constituent elements of cordierite with a metal element that has a different value of valence. Cordierite that has a high resistance to thermal shock is suitable as a catalyst support for automobile exhaust gas.

Preferably the defects consist of at least one kind of oxygen defect or lattice defect. A catalyst component of a comparable amount as in the prior art can be supported when cordierite crystals that have one or more defect per one unit crystal cell are included in the ceramic in a concentration of $4 \times 10^{-6}$% or higher.

The catalyst-loaded ceramic filter of the present invention preferably comprises the ceramic filter described above and a catalyst metal directly supported thereon. As the catalyst-loaded ceramic filter of the present invention does not have a coating layer, the advantages of the filter substrate, such as high particulate collecting rate, low pressure loss, low coefficient of thermal expansion and light weight, can be retained and, at the same time, an excellent purifying performance can be achieved by continuously burning the particulate matter that has been collected by the catalyst metal directly supported thereon.

Further, in the catalyst-loaded ceramic filter described above, a catalyst having a catalytic oxidation function is used as the catalyst supported on the ceramic filter. This constitution allows the catalyst metal to oxidize and burn the particulate matter collected in the pores of the filter substrate, thereby to purify the exhaust gas.

Specifically, a catalyst that can directly oxidize and burn the particulate matter included in the introduced exhaust gas can be used as the catalyst metal. Alternatively, such a catalyst may be used that oxidizes nitrogen oxide included in the introduced exhaust gas so that the particulate matter is oxidized and burned by the oxidized nitrogen oxide.

In the catalyst-loaded ceramic filter of the present invention, the catalyst metal is preferably supported directly in the pores by physical adsorption. Physical adsorption also results in higher catalyst retention performance than in the ordinary catalyst supporting configuration where catalyst metal particles are supported in pores formed in the porous coating layer. This configuration also has the advantage that the catalyst deteriorates less over a long period of use, because the catalyst metal can be uniformly distributed over the support and is less likely to coagulate.

The catalyst-loaded ceramic filter of the present invention uses, as the catalyst metal, one or more metal selected from among Pt, Pd, Rh, Ir, Ti, Cu, Ni, Fe, Co, W, Au, Ag, Ru, Mn, Cr, V and Se. These metals can chemically bond with the substituting element introduced into the cordierite or the like, that constitutes the filter substrate, and function as oxidizing catalysts so as to continuously burn the collected particulate matter.

BRIEF DESCRIPTION OF THE DRAWINGS

FIG. 2 is a schematic sectional view of a catalyst-loaded DPF of the prior art as a whole.

FIG. 3(a) is a sectional view of a catalyst-loaded DPF of the present invention where the catalyst is supported with a uniform density in the porous walls, and FIG. 3(b) is an enlarged view of a key portion when the catalyst is locally concentrated near the surfaces of the porous walls.

DESCRIPTION OF THE PREFERRED EMBODIMENTS

Figure 1A:
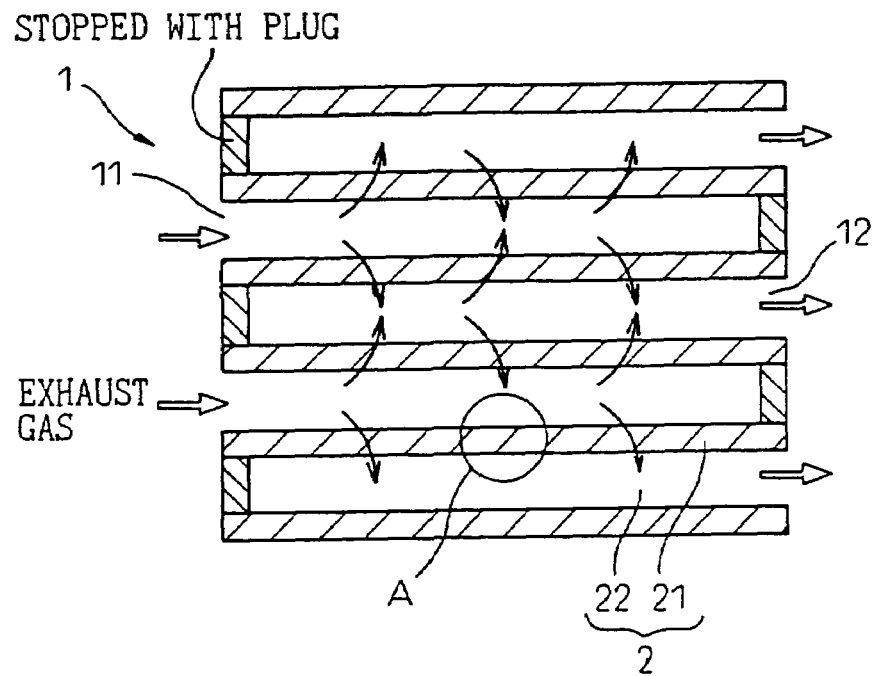
FIG. 1(a) is a schematic sectional view of a catalyst-loaded DPF of the present invention.
Figure 1B:
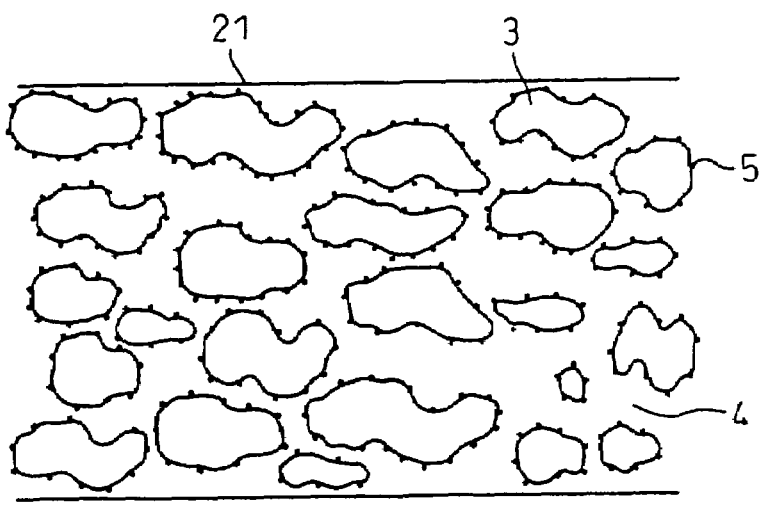
FIG. 1(b) is an enlarged view of portion A in FIG. 1(a).

The present invention applied to a catalyst-loaded filter for collecting particulate matter of diesel engine (hereinafter called DPF) will be described below, by way of an example, with reference to the accompanying drawings. FIG. 1(a) is a schematic diagram showing the catalyst-loaded DPF 1 of the present invention, wherein a filter substrate 2 is made of a porous ceramic material that is formed in honeycomb shape having a number of cells 22 that are separated from each other by porous walls 21. The cells are formed parallel to the direction of the exhaust gas flow (indicated by arrow in the drawing) so that cells 22 that adjoin each other have ends stopped with plugs at the inlet or outlet side in a staggered arrangement The porous wall 21 has continuous pores 4 running between ceramic grains 3 as shown in FIG. 1(b). Accordingly, exhaust gas introduced into the catalyst-loaded DPF 1 through an inlet 11 flows through the porous wall 21 between the cells 22 toward an outlet 12. During this process, particulate matter introduced together with the exhaust gas is collected in the pores 4 in the porous walls 21. Exhaust gas cleared of the particulate matter is discharged through the outlet 12 to the outside.

The ceramic material that makes the filter substrate 2 has one or more kinds of element among the constituent elements thereof being substituted with element other than the constituent elements, so that a catalyst metal 5 can be supported directly on the substituting element. As the ceramic material described above, one based on cordierite that has a theoretical composition of $2MgO.2Al_2O_3.5SiO_2$ is preferably used as the main component. Instead of cordierite, other ceramic materials such as alumina, spinel, aluminum titanate, silicon carbide, mullite, silica-alumina, zeolite, zirconia, silicon nitride and zirconium phosphate may also be used.

For the element that substitutes the constituent element (Si, Al or Mg, for example, in the case of cordierite) of the ceramic material that makes the filter substrate 2, an element is used that has a higher strength of bonding with the catalyst metal to be supported than the constituent element, and is capable of supporting the catalyst metal 5 through chemical bonding. Specifically, the substituting element may be one or more kind of element that is different from the constituent elements and has d or f orbit in the electron orbits thereof. Preferably used is an element that has an empty orbit in the d or f orbit or that has two or more oxidation states. An element that has empty orbit in the d or f orbit has energy level near that of the catalyst element being supported, which means a higher tendency to exchange electrons so as to bond with the catalyst metal. An element that has two or more oxidation states also has higher tendency to exchange electrons and provides the same effect.

Elements that have an empty orbit in the d or f orbit include Sc, Ti, V, Cr, Mn, Fe, Co, Ni, Y, Zr, Nb, Mo, Tc, Ru, Rh, La, Ce, Pr, Nd, Pm, Sm, Eu, Gd, Tb, Dy, Ho, Er, Tm, Lu, Hf, Ta, W, Re, Os, Ir and Pt, of which one or more element selected from among Ti, V, Cr, Mn, Fe, Co, Ni, Zr, Mo, Ru, Rh, W, Ce, Ir and Pt is preferably used. Among the elements described above, Ti, V, Cr, Mn, Fe, Co, Ni, Nb, Mo, Tc, Ru, Rh, Ce, Pr, Eu, Tb, Ta, W, Re, Os, Ir and Pt also have two or more stable oxidation states.

Besides these, elements which have two or more oxidation states include Cu, Ga, Ge, As, Se, Br, Pd, Ag, In, Sn, Sb, Te, I, Yb and Au. Among these, one or more selected from among Cu, Ga, Ge, Se, Pd, Ag and Au is preferably used.

When constituent element of the ceramic material is substituted with these elements, from 1% up to 50% of the atoms of the target constituent element are substituted by the substituting element. When one of the constituent elements is substituted with a plurality of substituting elements, the total number of substituted atoms is controlled within the above range. When the proportion of substituted atoms is less than 1%, the substitution cannot produce a sufficient effect. The proportion higher than 50% results in greater influence on the crystal structure of the ceramic material, and is not desirable. Preferably, the proportion is controlled in a range from 5% to 20%.

Part of the constituent element of the ceramic material that makes the filter substrate 2 can be substituted in the following procedure. First, before preparing the stock material for the ceramic, the quantity of material that supplies the constituent element to be substituted is reduced in accordance to the extent of substitution, and the material that supplies the substituting element is added and mixed by a common method. The mixture is formed into honeycomb structure by the extrusion molding process. The preform is dried and fired in an air atmosphere. Alternatively, the stock material for the ceramic prepared by reducing the quantity of material that supplies the constituent element to be substituted may be mixed, formed into honeycomb structure and dried, with the honeycomb preform being immersed in a solution that includes the substituting element before being dried, then degreased and fired in air atmosphere. In case the substituting element is supported on the dried filter substrate rather than being mixed into the ceramic material, a larger number of atoms of the substituting element are deposited near the surface of the preform and, as a result, substitution of the element occurs near the surface of the perform when firing, thus making it easier to form a solid solution.

The porosity of the filter substrate 2 is set to 40% or higher, and preferably 50% or higher. When the porosity is less than 40%, the pressure loss becomes excessive. Although the pressure loss decreases as the porosity increases, too high a porosity results in a low particulate matter collecting rate. Therefore, the porosity is preferably in a range from 40 to 80%, more preferably in a range from 50 to 70%. Also the proportion of pores measuring 100 μm cross or larger is preferably not higher than 20% of all pores formed in the filter substrate 2, and more preferably the proportion of pores measuring 70 μm across or larger is not higher than 10% of all pores. When the size of the pores 4 is larger than 100 μm, particulate matter passes through the porous wall 21 resulting in lower particulate matter collecting rate. Mean pore size of the filter substrate 2 is preferably set to 50 μm or smaller, more preferably 30 μm or smaller, so as to improve the particulate matter collecting rate while maintaining a low pressure loss that is achieved by a high porosity.

In order to form the pores 4 of the specified size in the specified porosity in the filter substrate 2, the stock material to make the ceramic is prepared by adding an organic foaming agent that expands at a temperature below 100° C., and a combustible material such as carbon that burns at a temperature lower than the firing temperature. The organic foaming agent and the combustible material are burned and lost in the process of firing the honeycomb preform, leaving vacancies that constitute the pores 4. Thus the porosity and the pore size can be controlled by regulating the quantity of the additives and the particle size of the ceramic material. Preferably, quantity of the organic foaming agent and the combustible material combined is controlled in a range from 5 to 50% by weight of the ceramic material. The mean pore size becomes too small when the total quantity is less than 5%, and too large when the total quantity exceeds 50%.

For the catalyst metal 5 supported by the filter substrate 2, for example, one or more metal selected from among Pt, Pd, Rh, Ir, Ti, Cu, Ni, Fe, Co, W, Au, Ag, Ru, Mn, Cr, V and Se is used. These metals chemically bond with the substituting element introduced into the ceramic material that constitutes the filter substrate 2, and a function as an oxidizing catalyst that continuously burns the particulate matter that has been collected in the pores 4. Alternatively, nitrogen oxide (NO) included in the exhaust gas may be oxidized into $NO_2$, so that the particulate matter is oxidized and burned by the nitrogen oxide ($NO_2$) that has been oxidized.

To deposit the catalyst metal 5 on the filter substrate 2, such a solution is usually used that is prepared by dissolving a compound of the catalyst metal 5 into a solvent such as water or alcohol. The filter substrate 2 is impregnated with this solution and is then dried and fired in air atmosphere. The firing temperature is required only to be not lower than the temperature at which the compound of the catalyst metal is thermally decomposed, and may be set in accordance to such factors as the catalyst metal and the compound to be used. It is preferable to fire at a lower temperature since it makes the metal particle size produced by thermal decomposition smaller, and causes the metal particles to be highly dispersed over the support.

When two or more kinds of catalyst metal are used in combination, the ceramic preform may be immersed in a solution that includes the plurality of catalyst metals. In case Pt and Rh are used as the catalyst metals, for example, the preform may be immersed in a solution that includes the compounds of these metals, and is then dried and fired in an air atmosphere.

The ceramic material that constitutes the filter substrate 2 may also have numerous pores on the surface thereof wherein the catalyst are directly supported. As the catalyst ion to be supported typically has diameter of about 0.1 nm, the catalyst ions can be supported in the pores formed in the cordierite surface, provided that the pores are larger than 0.1 nm across. In order to keep the ceramic support strong enough, preferably the pores are as small as possible, and are within 1000 times (100 nm) the diameter of the catalyst ion. The depth of the pores is set to not less than 1.2 times (0.05 nm) the lateral size in order to retain the catalyst ion. In order to support a quantity of catalyst component comparable to that in the prior art (1.5 g/L) in the pores of this size, the density of the pores is set to $1 \times 10^{11}$/L or higher, preferably $1 \times 10^{16}$/L or higher, and more preferably $1 \times 10^{17}$/L or higher.

Pores can be formed in the ceramic support, at a density not less than the value described above, when cordierite crystals that have one or more defects, either oxygen defect or lattice defect or both, per one unit crystal cell, are included in the ceramic material in a concentration of $4 \times 10^{-6}$% or higher, preferably $4 \times 10^{-5}$% or higher, or when oxygen defects and/or lattice defects are included at a density of $4 \times 10^{-8}$ per one unit crystal cell of cordierite or higher, preferably $4 \times 10^{-7}$ or higher. Details of the pores and method for forming the same will be described below.

Among the pores formed in the ceramic surface, defects of the crystal lattice include oxygen defects and lattice defects (metal lattice vacancy and lattice strain). Oxygen defects are caused by a deficiency of oxygen required to form the ceramic crystal lattice, and the catalyst component can be supported in the pores produced by the vacancy of oxygen. Lattice defects are caused when more oxygen is introduced than is required to form the ceramic crystal lattice, and the catalyst component can be supported in the pores produced by crystal lattice strain or metal lattice vacancy.

Oxygen defects can be formed in the crystal lattice by employing any of the following methods in the firing process after molding the ceramic material for forming cordierite that includes an Si source, an Al source and an Mg source: ① to decrease the pressure of the firing atmosphere or make it a reducing atmosphere; ② to use a compound, that does not include oxygen, for at least a part of the stock material, and fire the material in low oxygen concentration atmosphere thereby causing oxygen deficiency in the firing atmosphere or in the starting material; or ③ to substitute a part of at least one kind of the constituent elements of the ceramic material except for oxygen with an element that has a lower value of valence than that of the substituted element. As the constituent elements turn to positive ions such as Si (4+), Al (3+) and Mg (2+) in the case of cordierite, substituting these elements with an element that has lower value of valence results in a shortage of positive charge of an amount corresponding to the difference in the value of valence between the substituted and substituting elements. Thus oxygen defects are formed by discharging O (2−) having a negative charge thereby to maintain the electrical neutrality of the crystal lattice.

Lattice defects can be formed by ④ substituting a part of the constituent elements of the ceramic material except for oxygen with an element that has a higher value of valence than that of the substituted element. When at least a part of Si, Al and Mg that are constituent elements of cordierite is substituted with an element that has a higher value of valence than that of the substituted element, an excessive positive charge is produced of an amount corresponding to the difference in the value of valence between the substituted and substituting elements and the amount of substitution. Thus a required amount of O (2−) having negative charge is taken in so as to maintain the electrical neutrality of the crystal lattice. The oxygen that has been introduced prevents the cordierite crystal lattice being formed orderly, thereby forming lattice strain. Electrical neutrality may also be maintained by discharging a part of Si, Al and Mg so as to leave vacancies to be formed. In this case, a firing process is carried out in air atmosphere, so that sufficient supply of oxygen is provided. The defects described above are considered to be as small as several angstroms or less, and therefore cannot be counted when measuring the specific surface area by a common method such as the BET method that uses nitrogen molecules.

The number of oxygen defects and lattice defects is correlated to the amount of oxygen included in the cordierite. In order to support the catalyst component of the required quantity described above, the proportion of oxygen is controlled to be less than 47% by weight (oxygen defect) or higher than 48% by weight (lattice defect). When the proportion of oxygen becomes less than 47% by weight due to the formation of oxygen defects, the number of oxygen atoms included in one unit crystal cell of cordierite becomes less than 17.2, and the lattice constant of the $b_o$ axis of the cordierite crystal becomes less than 16.99. When the proportion of oxygen becomes higher than 48%, by weight, due to the formation of lattice defects, the number of oxygen atoms included in one unit crystal cell of cordierite becomes larger than 17.6, and lattice constant of the $b_o$ axis of the cordierite crystal becomes larger or less than 16.99.

Among the pores that can support catalyst, microscopic cracks in the ceramic surface can be formed in a great number in at least one of an amorphous phase and a crystal phase by applying thermal shock or acoustic shock waves to the cordierite. For the cordierite structure to have sufficient strength, it is better to make the cracks smaller, about 100 nm or less in width, and preferably about 10 nm or less.

Thermal shock is usually applied by heating the cordierite structure and then quenching it. The thermal shock may also be applied after an amorphous phase and a crystal phase have been formed in the cordierite structure, by a method of heating to a predetermined temperature and then quenching a cordierite honeycomb structure formed by firing process after molding and degreasing the ceramic material for forming cordierite that includes an Si source, an Al source and an Mg source, or quenching from a predetermined temperature in the process of cooling the fired honeycomb structure. Thermal shock for generating cracks can be produced when the difference between the heating temperature and the temperature after quenching (impact temperature difference) is about 80° C. or higher, with the cracks becoming larger as the temperature difference becomes larger. However, since too large cracks make it difficult to maintain the shape of the honeycomb structure, the impact temperature difference should usually be not higher than about 900° C.

The amorphous phase of the cordierite exists in the form of layers around the crystal phase. When thermal shock is applied by heating the cordierite and then quenching, thermal stress is generated in the interface between the amorphous phase and the crystal phase, the magnitude of the thermal stress being determined by the difference in the coefficient of thermal expansion between the amorphous phase and the crystal phase and the impact temperature difference. Microscopic cracks are generated when the amorphous phase or the crystal phase cannot withstand the thermal stress. The number of microscopic cracks to be generated can be controlled by means of the proportion of the amorphous phase. The number of cracks can be increased by adding an increased amount of such a trace component of the material that is thought to contribute to the formation of amorphous phase (alkali metal, alkali earth metal, etc.). Acoustic shock waves such as ultrasound or vibration may also be used instead of thermal shock. Microscopic cracks are generated when a weaker portion of the cordierite structure cannot withstand the energy of acoustic shock waves. In this case, the number of microscopic cracks to be generated can be controlled by regulating the energy of the acoustic shock wave.

Among the pores that can support the catalyst, deficiencies of the constituent elements of the ceramic material are generated by eluting the constituent elements of cordierite or impurity by a liquid phase process. For example, element deficiency can be generated by eluting metallic elements such as Mg or Al included in the cordierite crystal, alkali metal element or alkali earth element included in the amorphous phase, or the amorphous phase itself into high-temperature, high-pressure water, supercritical water, alkali solution or another solution, so that the element deficiencies make microscopic pores that support catalyst. Deficiencies can also be formed chemically or physically in the gas phase process. For example, dry etching may be used as a chemical process, and sputtering can be employed as a physical process, where the number of pores generated can be controlled by regulating the duration of etching or energy supply.

As an example of the manufacturing method for the catalyst-loaded DPF 1 of the present invention, a method for depositing the catalyst metal 5 will be described below where cordierite, that has a part of Al of the constituent element thereof being substituted, is used as the ceramic material making the filter substrate 2. ordinary materials such as talc (a ceramic material based on $MgO.SiO_2$), molten silica (a ceramic material based on $SiO_2$), aluminum hydroxide $(Al(OH)_3)$, alumina $(Al_2O_3)$ and kaolin (a ceramic material based on $SiO_2.Al_2O_3$) are used, with the Al content being reduced by 5 to 60% of the total moles, as the material to form cordierite. As molten silica decomposes in the firing process and aluminum hydroxide loses water of crystallization thereof through evaporation, pores can be easily formed. Thus the filter substrate 2 having a high porosity can be made by using these materials.

An organic foaming agent and carbon are added to the material described above, in a proportion from 5 to 50% by weight and the material is mixed in a common process and formed in honeycomb shape by extrusion molding, with the preform being dried by heating to about 80 to 100° C. The organic foaming agent expands in this drying process. Then the dried preform is immersed in a solution including $WO_3$ and CoO that are compounds of the substituting element W and Co. The preform taken out of the solution is dried with a large amount of substituting elements deposited on the surface of the honeycomb structure, and is degreased at about 900° C. in air atmosphere, before being heated at a rate of 5° C./hr to 75° C./hr and fired at a temperature of about 1300 to 1390° C. In this process, the organic foaming agent and carbon are lost by burning, resulting in the filter substrate 2 that has the pores 4.

Then the catalyst metal 5 is deposited on the filter substrate 2 that has been made as described above, thereby to produce the catalyst-loaded DPF 1 of the present invention. First, a compound of the catalyst metal 5 (for example, nitrate, hydrochloride, acetate or the like of a noble metal) is dissolved in a solvent such as water, and stirred to attain uniform concentration. The filter substrate 2 is immersed in this catalyst solution. The filter substrate 2 taken out of the solution is dried in an air flow and fired at a temperature in a range from about 500° C. to 900° C. so as to fix the catalyst metal 5 on the support. The particle size of the catalyst metal 5 is in a range from 0.5 nm to 30 nm, and preferably in a range from 1 nm to 10 nm. The quantity of the catalyst supported on the substrate is preferably 0.5 g/L (for example, $4.45 \times 10^{19}$ pieces/L in the case of 1 nm Pt particles) or more.

The catalyst-loaded DPF 1, of the present invention, made as described above has the catalyst metal 5 directly supported on the ceramic material of the filter substrate 2. Therefore, a catalytic function can be given to the DPF while maintaining the high porosity and low pressure loss of the filter substrate 2. By properly setting the maximum pore size, mean pore size and other parameters, it is possible to achieve a high particulate collecting rate, burn the collected particulate matter continuously and purify the exhaust gas efficiently. Moreover, the DPF has excellent characteristics in that it is lighter in weight, has lower coefficient of thermal expansion, higher thermal shock resistance and lower heat capacity compared to the catalyst-loaded DPF of the prior art, and is capable of developing the catalyst activation in the early stage.

In contrast, the catalyst-loaded DPF of the prior art has the coating layer of γ-alumina formed on the surface of ceramic particles as shown in FIG. 2. As a result, porosity becomes lower, pressure loss becomes higher and the coating layer results in a weight increase, thus leading to a higher coefficient of thermal expansion and a higher heat capacity.

Table 1 compares the weight and pressure loss between the catalyst-loaded DPF 1 of the present invention (porosity of 60% and mean pore size of 25 μm) made by the method described above, and the catalyst-loaded DPF of the prior art made by wash coating of γ-alumina on cordierite. Pressure loss was measured on a DPF, having a volume of 1500 cc, cells with wall thickness of 300 μm and cell density of 300 cpsi, that was installed on a diesel engine having displacement of 2200 cc and running at 2000 rpm with a torque of 100 Nm.

TABLE 1

|  | Catalyst-loaded DPF of the invention | Catalyst-loaded DPF of the prior art |
| --- | --- | --- |
| Weight of wash coat | 0 g/L | 100 g/L |
| Weight reduction | −150 g | 0 g |
| Pressure loss | 1.0 kPa | 3.0 kPa |

As will be clear from Table 1, the catalyst-loaded DPF 1 of the present invention is lighter than the catalyst-loaded DPF of the prior art by 150 g and experiences greatly reduced pressure loss of 1.0 kPa, compared to that of 3.0 kPa in the case of the catalyst-loaded DPF of the prior art.

The catalyst-loaded DPF 1 made by the method described above has the catalyst metal 5 supported uniformly in the porous walls 21 as shown in FIG. 3(a). This constitution has an advantage of the capability to burn the particulate matter uniformly.

Alternatively, the catalyst metal 5 may also be supported in the porous walls 21 while being concentrated near the surface as shown in FIG. 3(b). This constitution has an advantage of the capability to oxidize NO near the surface so as to burn the particulate matter, that has been collected in the porous walls 21, by means of $NO_2$ generated by the oxidation. This constitution is preferably employed in the upstream region.

In order to concentrate the catalyst metal 5 near the surface, the inner surface of the porous walls 21 is coated with a resin before immersing the filter substrate 2 in the catalyst solution, and then the catalyst metal 5 is deposited by a method similar to that described previously. The catalyst solution cannot wet the inside of the porous walls 21 because it is covered by the resin, and therefore the catalyst metal 5 is deposited only on the surface of the porous walls 21.

Figure 4A:
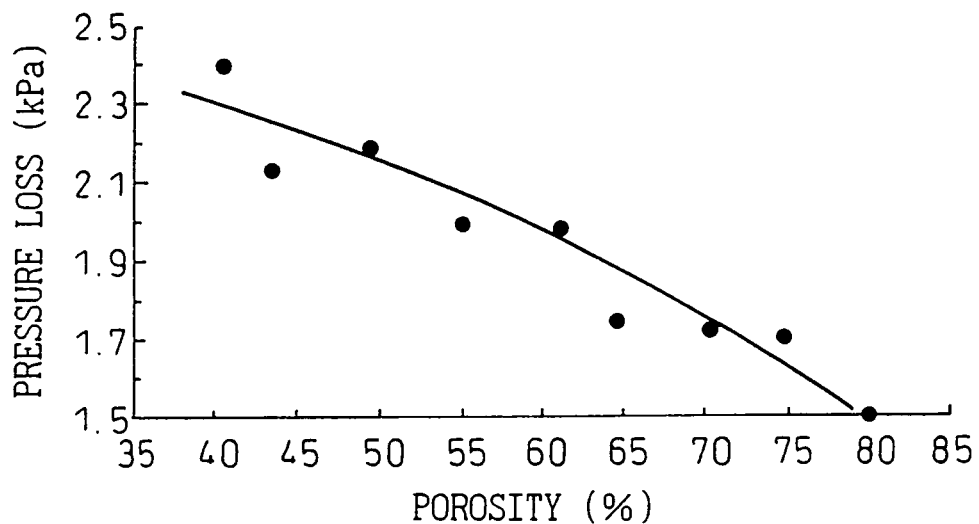
FIG. 4(a) shows the relationship between porosity and pressure loss in the catalyst-loaded DPF.
Figure 4B:
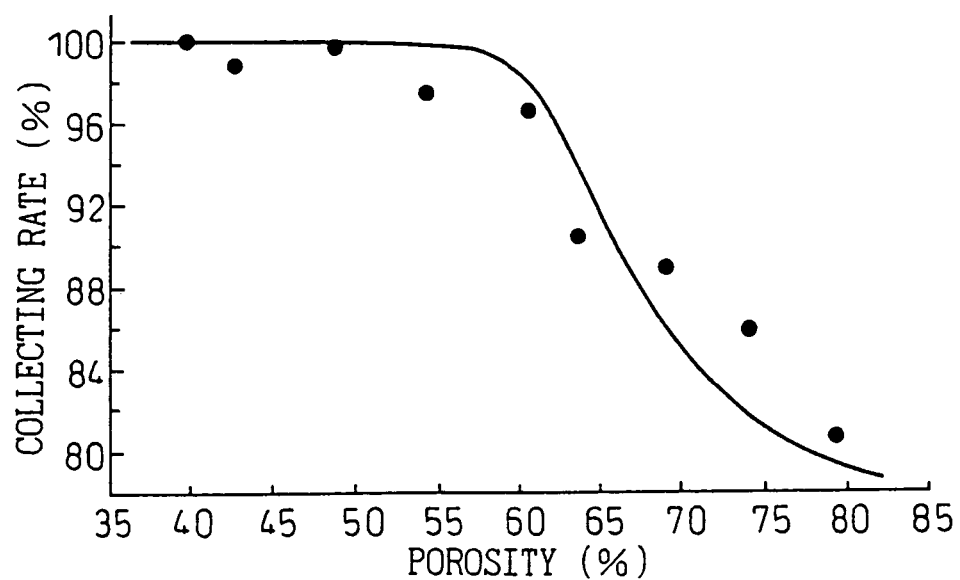
FIG. 4(b) shows the relationship between porosity and particulate matter collecting rate.

Various catalyst-loaded DPFs 1 having different porosities were made by the method described above, and the variation in the pressure loss and particulate collecting rate with changes in the porosity were studied. FIG. 4(a) shows the relationship between the porosity and the pressure loss and FIG. 4(b) shows the relationship between the porosity and the particulate matter collecting rate. Measuring conditions were as follows.

Support size: 129 mm in diameter and 150 mm long

Cell wall thickness: 12 mil (300 μm)

Number of cells: 300 cells per square inch

Air flow rate: 5000 NL/min.

Timing of measurement: When 2 grams of particulate matter has been collected

As will be clear from FIG. 4(a), the pressure loss increases as the porosity becomes lower, the pressure loss being 2.4 kPa when the porosity is 40%, and the pressure loss being 2.2 kPa when the porosity is 50%. FIG. 4(b) also shows that particulate collecting rate begins to decrease when the porosity exceeds 55%, the particulate collecting rate is 85% when the porosity is 70%, and the particulate collecting rate is 80% when the porosity is 80%. Therefore both the pressure loss and the particulate collecting rate can be maintained at satisfactory levels when the porosity is set in a range from 40% to 80%, preferably from 50% to 70%.

Figure 5A:
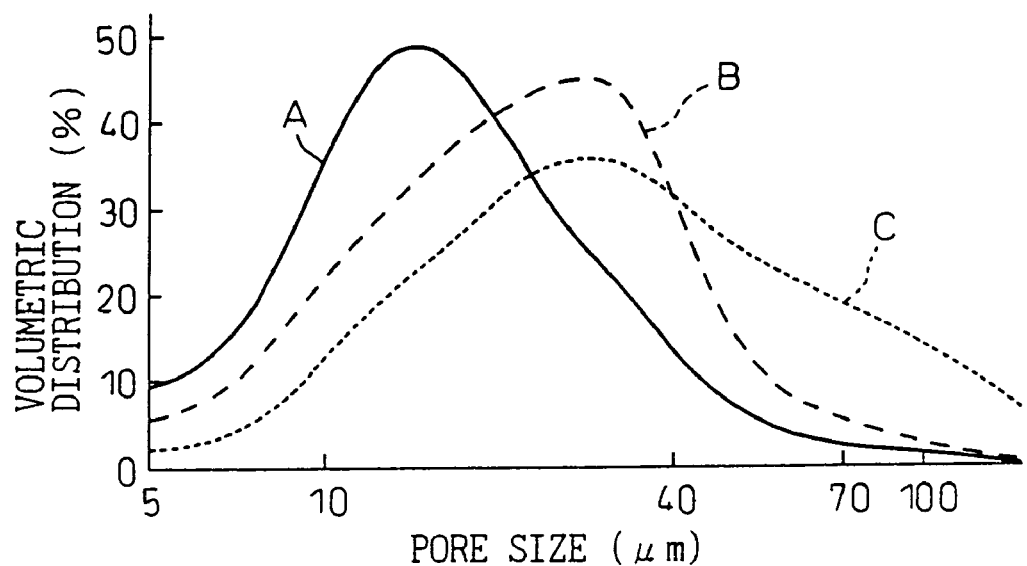
FIG. 5(a) shows the relationship between pore size and volumetric distribution.
Figure 5B:
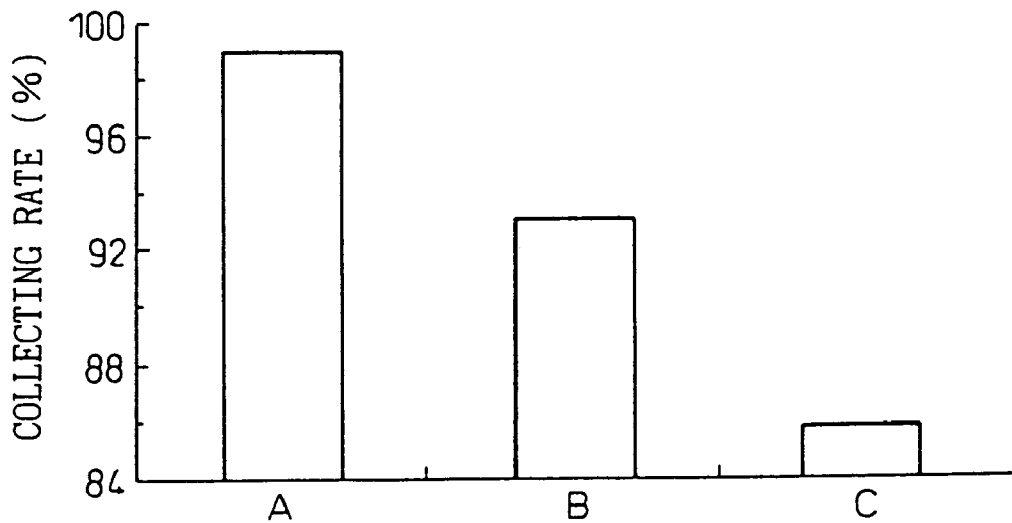
FIG. 5(b) shows the particulate matter collecting rates of the catalyst-loaded DPFs having different pore distributions.

Three kinds (A, B, C) of catalyst-loaded DPFs 1 having different pore distributions were made by the method described above, and the variation in the particulate matter collecting rate was studied with the results shown in FIGS. 5(a) and 5(b). FIG. 5(a) shows the relationship between the pore size and volume distribution, and FIG. 5(b) shows the particulate matter collecting rates of the catalyst-loaded DPFs A, B and C. Measuring conditions were the same as those of FIG. 4. As will be clear from FIGS. 5(a) and 5(b), particulate matter collecting rate increases as the proportion of small pores increases. For example, the catalyst-loaded DPF C that includes a relatively high proportion of pores 4 measuring 100 μm and larger shows a particulate collecting rate less than 90%, while the catalyst-loaded DPF B that hardly includes pores 4 measuring 100 μm or larger and includes a low proportion of pores 4 measuring 70 μm and larger shows a particulate collecting rate higher than 92%. The catalyst-loaded DPF A of which pores mostly measure 40 μm or smaller with a very small proportion of pores 4 measuring 70 μm and larger shows the highest particulate collecting rate of 99% or higher.

Based on the results described above, a particulate collecting rate of 80% or higher can be achieved when the proportion of pores 4 measuring 100 μm and larger is not higher than 20% of all the pores included in the filter substrate 2, and a particulate collecting rate of 90% or higher can be achieved when the proportion of pores 4 measuring 70 μm and larger is 10% or less of all the pores included in the filter substrate 2.

Figure 6:
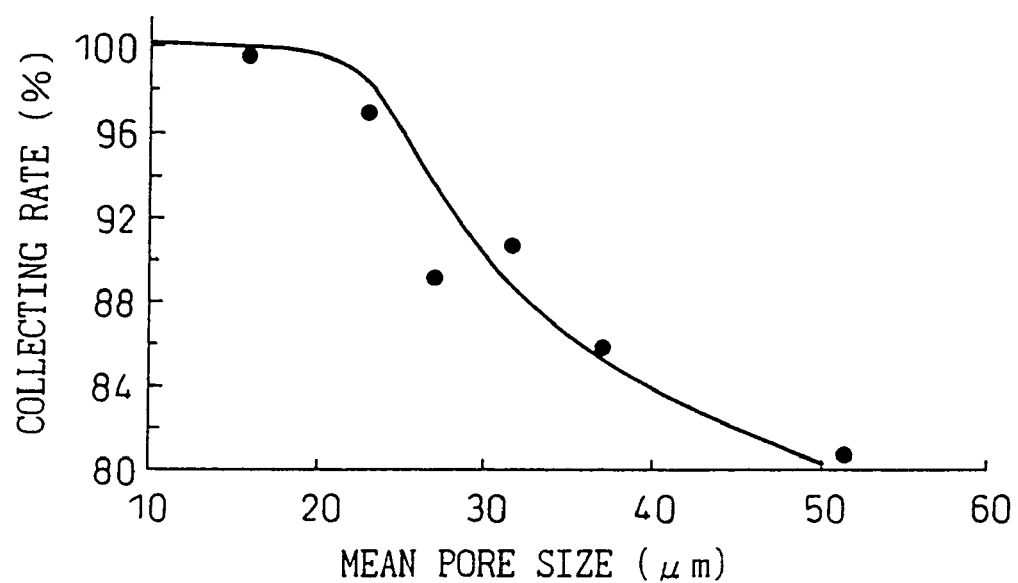
FIG. 6 shows the relationship between mean pore size and the particulate matter collecting rates of the catalyst-loaded DPF.

FIG. 6 shows the relationship between the mean pore size and the particulate collecting rate of the catalyst-loaded DPFs 1 having different mean pore sizes made by the method described above. Measuring conditions were the same as those of FIGS. 4(a) and 4(b). As will be clear from FIG. 6, the particulate collecting rate begins to decrease when the mean pore size exceeds 20 μm, and the particulate collecting rate becomes lower than 90% when the mean pore size exceeds 30 μm. When the mean pore size is 50 μm, the particulate collecting rate becomes about 80%. Therefore a particulate collecting rate of 80% or higher can be achieved when the mean pore size is 50 μm or smaller, and a particulate collecting rate of 85% or higher can be achieved when the mean pore size is 30 μm or smaller.

What is claimed is:

1. A ceramic filter comprising a porous filter substrate having a porosity of 40% or higher and formed in a honeycomb structure that has a number of cells separated from each other by porous walls, with one end of each cell being stopped at the inlet or outlet side thereof in a staggered arrangement, wherein the ceramic material of said filter substrate has one or more elements among the constituent elements thereof being substituted with an element other than the constituent elements, so that a catalyst metal can be supported directly on said substituting element.

2. The ceramic filter according to claim 1, wherein said filter substrate collects particulate matter, that is included in a gas introduced thereto, in pores of said porous walls.

3. The ceramic filter according to claim 1, wherein the porosity of said filter substrate is 50% or higher.

4. The ceramic filter according to claim 1, wherein the porosity of said filter substrate is up to 80%.

5. The ceramic filter according to claim 1, wherein the porosity of said filter substrate is from 50% up to 70%.

6. The ceramic filter according to claim 1, wherein the proportion of pores measuring 100 μm and larger across is not higher than 20% of all the pores included in said filter substrate.

7. The ceramic filter according to claim 1 wherein the proportion of pores measuring 70 μm and larger across is not higher than 10% of all the pores included in said filter substrate.

8. The ceramic filter according to claim 1, wherein the mean pore size of said filter substrate is 50 μm or smaller.

9. The ceramic filter according to claim 1, wherein the mean pore size of said filter substrate is 30 μm or smaller.

10. The ceramic filter according to claim 1, wherein pores of said filter substrate communicate with each other.

11. The ceramic filter according to claim 1, wherein the ceramic material of said filter substrate includes cordierite as the main component.

12. The ceramic filter according to claim 1, wherein the substituting element that substitutes said constituent element is one or more element(s) that have d or f orbits in the electron orbits thereof.

13. A catalyst-loaded ceramic filter that has a catalyst metal supported directly on said ceramic filter of claim 1.

14. The catalyst-loaded ceramic filter according to claim 13 wherein said catalyst metal has a catalytic oxidation function.

15. The catalyst-loaded ceramic filter according to claim 14, wherein said catalyst metal either directly oxidizes particulate matter included in a gas introduced or oxidizes nitrogen oxide included in said gas.

16. The catalyst-loaded ceramic filter according to claim 13, wherein said catalyst metal is directly supported on the substituting element through chemical bond.

17. The catalyst-loaded ceramic filter according to claim 13, wherein said catalyst metal is one or more metal selected from Pt, Pd, Rh, Ir, Ti, Cu, Ni, Fe, Co, W, Au, Ag, Ru, Mn, Cr, V and Se.

18. A ceramic filter comprising a porous filter substrate having a porosity of 40% or higher and formed in a honeycomb structure that has a number of cells separated from each other by porous walls, with one end of each cell being stopped at the inlet or outlet side thereof in a staggered arrangement, wherein said filter substrate has a ceramic surface with numerous pores therein, so that a catalyst metal can be supported directly in said pores.

19. The ceramic filter according to claim 18, wherein said pores comprise at least one member selected from defects in a ceramic crystal lattice, microscopic cracks in the ceramic surface and deficiencies in the elements that constitute the ceramic material.

20. The ceramic filter according to claim 19, wherein said microscopic cracks are 100 nm or less in width.

21. The ceramic filter according to claim 19, wherein said pores have lateral dimension 1000 times or less as large as the diameter of a catalyst ion to be supported therein, and the density of the pores is $1 \times 10^{11}$/L or higher.

22. The ceramic filter according to claim 19, wherein said filter substrate comprises a ceramic material which includes cordierite as the main component, and said pores comprise defects that are formed by substituting a part of the constituent elements of cordierite with a metal element that has different value of valence.

23. The ceramic filter according to claim 22, wherein said defects comprise at least one of oxygen defects or lattice defects, and cordierite crystals that have one or more defects per one unit crystal cell are included in the ceramic material in a concentration of $4 \times 10^{-6}$% or higher.

24. A catalyst-loaded ceramic filter comprising the ceramic filter of claim 18 that supports the catalyst metal directly thereon.

25. The catalyst-loaded ceramic filter according to claim 24, wherein said catalyst metal has a catalytic oxidation function.

26. The catalyst-loaded ceramic filter according to claim 25, wherein said catalyst metal either directly oxidizes particulate matter included in a gas introduced or oxidizes nitrogen oxide included in said gas.

27. The catalyst-loaded ceramic filter according to claim 24, wherein said catalyst metal is directly supported in said pores through physical adsorption.

28. The catalyst-loaded ceramic filter according to claim 24, wherein said catalyst metal is one or more metal selected from among Pt, Pd, Rh, Ir, Ti, Cu, Ni, Fe, Co, W, Au, Ag, Ru, Mn, Cr, V and Se.

* * * * *